(12) United States Patent
Vallejo

(10) Patent No.: US 8,714,661 B2
(45) Date of Patent: May 6, 2014

(54) WHEEL FRAME, ASSEMBLY AND METHOD

(75) Inventor: Carlos A. Vallejo, Erie, PA (US)

(73) Assignee: General Electric Company, Schenectady, NY (US)

( * ) Notice: Subject to any disclaimer, the term of this patent is extended or adjusted under 35 U.S.C. 154(b) by 569 days.

(21) Appl. No.: 13/035,008

(22) Filed: Feb. 25, 2011

(65) Prior Publication Data

US 2012/0217788 A1 Aug. 30, 2012

(51) Int. Cl.
*B60B 27/00* (2006.01)

(52) U.S. Cl.
USPC ..................................... 301/105.1

(58) Field of Classification Search
USPC ............ 301/105.1, 137, 6.5, 10.1, 11.1, 13.1, 301/13.2, 36.1, 35.628; 29/894.361; 180/65.51, 380, 385
See application file for complete search history.

(56) References Cited

U.S. PATENT DOCUMENTS

| | | |
|---|---|---|
| 2,386,917 A | 10/1945 | Thornton |
| 3,042,145 A | 7/1962 | Bixby |
| 3,892,300 A | 7/1975 | Hapeman et al. |
| 3,951,481 A | 4/1976 | Ritter, Jr. |
| 4,799,564 A | 1/1989 | Iijima et al. |
| 6,148,941 A * | 11/2000 | Hinton et al. ............... 180/65.51 |
| 2003/0010564 A1 | 1/2003 | Hinton et al. |
| 2009/0065284 A1* | 3/2009 | Nakazato et al. ............. 180/380 |
| 2009/0102275 A1* | 4/2009 | Rivera et al. ................ 301/105.1 |

FOREIGN PATENT DOCUMENTS

| | | |
|---|---|---|
| DE | 4101222 | 7/1991 |
| DE | 102008014105 A1 | 1/2009 |
| WO | 2009055376 A1 | 4/2009 |

OTHER PUBLICATIONS

PCT International Search Report mailed Apr. 1, 2009.
Search Report and Written Opinion from corresponding PCT Application No. PCT/US2012/026614 dated Aug. 6, 2012.
International Preliminary Report on Patentability from corresponding PCT Application No. PCT/US2012/026614 dated Aug. 27, 2013 (mailed Sep. 6, 2013).

\* cited by examiner

*Primary Examiner* — Joseph Pape
*Assistant Examiner* — Dana Ivey
(74) *Attorney, Agent, or Firm* — GE Global Patent Operation; John A. Kramer

(57) ABSTRACT

A wheel frame for a vehicle including a unitary cylindrical body having a radially inward facing surface and a radially outward facing surface surrounding a wheel axis and extending from an integrally formed mounting flange to an open hub end. The radially inward facing surface of the body including a portion adjacent the hub end of the body that is enlarged for receiving at least a portion of an electric motor assembly.

17 Claims, 6 Drawing Sheets

WHEEL FRAME, ASSEMBLY AND METHOD

FIELD OF THE INVENTION

Embodiments of the invention relate to wheel drive assemblies, and, more particularly, to wheel frames for use in wheel drive assemblies of off-highway vehicles.

BACKGROUND OF THE INVENTION

Large off-highway vehicles ("OHVs"), such as mining vehicles used to haul heavy payloads excavated from open pit mines, are well known and usually employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque low speed rotational energy output which is supplied to the rear wheels.

Typical operating loads in an off-highway vehicle (OHV) may exceed one hundred tons, while the gross weight of vehicle and load may be several hundred tons. The weight of a single wheel drive assembly can be in excess of ten tons, and inertia of the wheel drive assembly can affect operation of the vehicle as a whole. Accordingly, it is desirable to reduce wheel drive assembly weight while maintaining strength to support and move the entire heavy vehicle.

Large components within OHV wheel drive assemblies have been fabricated as weldments, i.e., the components have been forged, bent, or pressed as separate pieces that then have been joined by welding. Such weldments can include, for example, wheel frames joining the wheel drive assemblies to the OHV frame or axle box, as well as wheel hubs to which tires are mounted. Although weldments can be made to very complex shapes at relatively low cost, and thereby have been preferred as enabling the placement of material only where needed to carry load, adequate heat treatment of very large weld joints has sometimes been challenging, and such joints have been difficult to fabricate. Accordingly, it is desirable to provide unitary wheel assembly components shaped to minimize non-load-bearing material, without being so complex as to require welded fabrication.

BRIEF DESCRIPTION OF THE INVENTION

In one embodiment of the invention, a wheel frame for a vehicle has a unitary cylindrical body. The body of the wheel frame includes a radially inward facing surface and a radially outward facing surface surrounding a wheel axis and extending from an integrally formed mounting flange to an open hub end. The radially inward facing surface of the body includes a portion adjacent the hub end of the body that is enlarged for receiving at least a portion of an electric motor assembly.

In another embodiment of the invention, a wheel assembly for a vehicle includes a unitary cylindrical wheel frame and a unitary cylindrical wheel hub operatively connected to rotate with respect to the wheel frame. The unitary wheel frame has a radially inward facing surface and a radially outward facing surface surrounding a wheel axis and extending from an integrally formed mounting flange to an open hub end, the radially inward facing surface of the wheel frame including, adjacent the hub end, a portion adapted to house an electric motor assembly. The unitary wheel hub is disposed around the hub end of the wheel frame and includes at least one bore configured to receive bolts to secure the wheel hub to a wheel rim.

In another embodiment of the invention, a wheel hub for a vehicle has a unitary cylindrical body having a first end with an integrally formed flange and a second end opposite the first end. The unitary body includes a plurality of bores configured to receive fasteners to secure the wheel hub to a wheel rim.

In a further embodiment of the invention, a vehicle wheel can be assembled by installing a torque tube over a hub end of a unitary cast wheel frame, securing a flange portion of a unitary cast wheel hub to the torque tube, and bolting a first wheel rim to the flange portion of the unitary cast wheel hub.

In context of the invention, "unitary" refers to a component that is monolithic or otherwise made in a single piece of material. "Integrally formed" refers to monolithic or jointless components made in a single piece, even though the components may have different functions or physical configurations.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
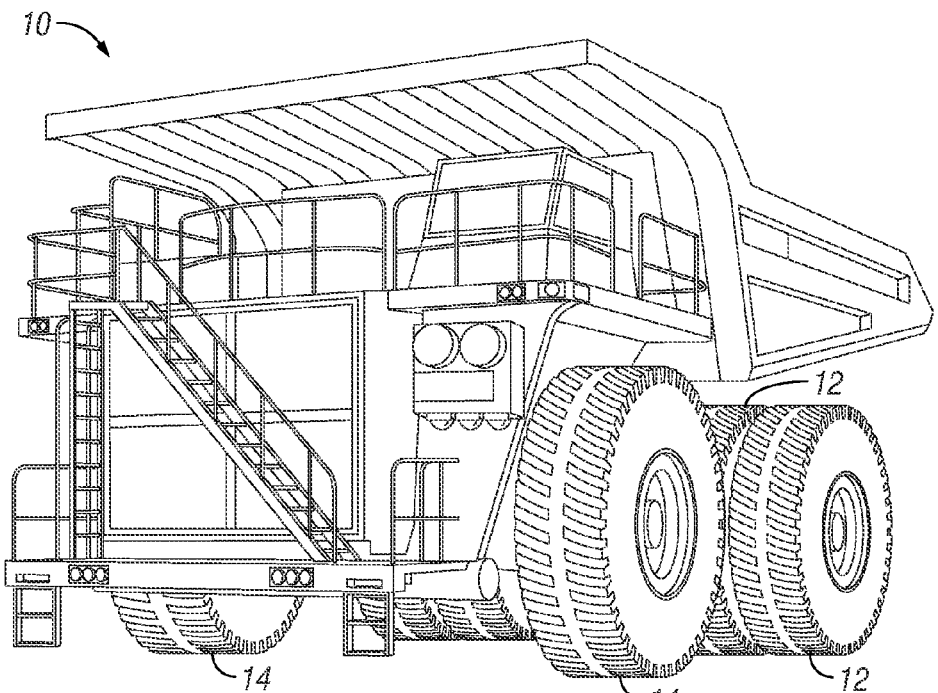
FIG. 1 is a perspective view of an OHV.

Reference will be made below in detail to exemplary embodiments of the invention, examples of which are illustrated in the accompanying drawings. Wherever possible, the same reference numerals used throughout the drawings refer to the same or like parts.

Figure 2:
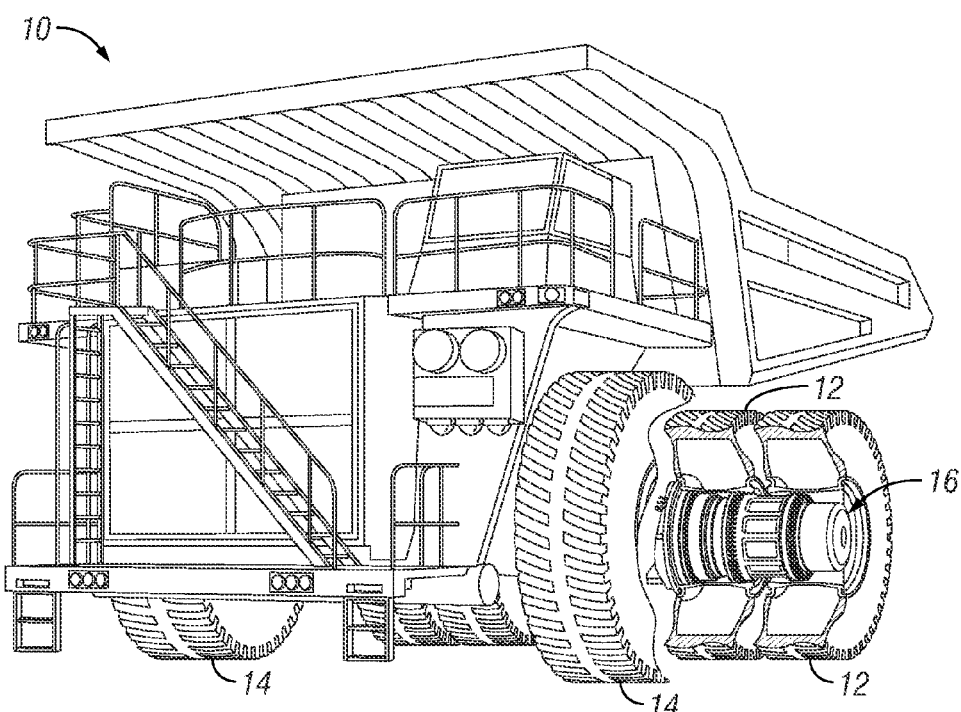
FIG. 2 is a partial perspective cutaway view showing a wheel drive assembly of the OHV shown in FIG. 1.

An embodiment of the inventive wheel frame 18 and wheel hub 22 is configured for use with a wheel assembly 16 of an OHV 10 as depicted in FIGS. 1 and 2. The OHV 10 is supported on paired dual rear drive tire assemblies 12 and on single front steering tire assemblies 14. As shown in FIG. 2, each pair of rear drive tire assemblies 12 are mounted on a wheel assembly 16.

Figure 3:
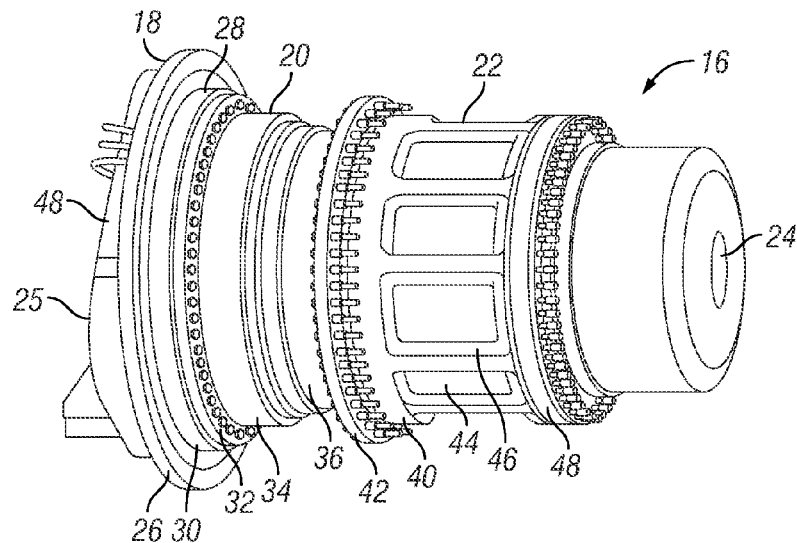
FIGS. 3 and 4 are partial side and end perspective views of the wheel drive assembly shown in FIG. 2, for use with a wheel frame and wheel hub assembly according to an embodiment of the present invention.
Figure 4:
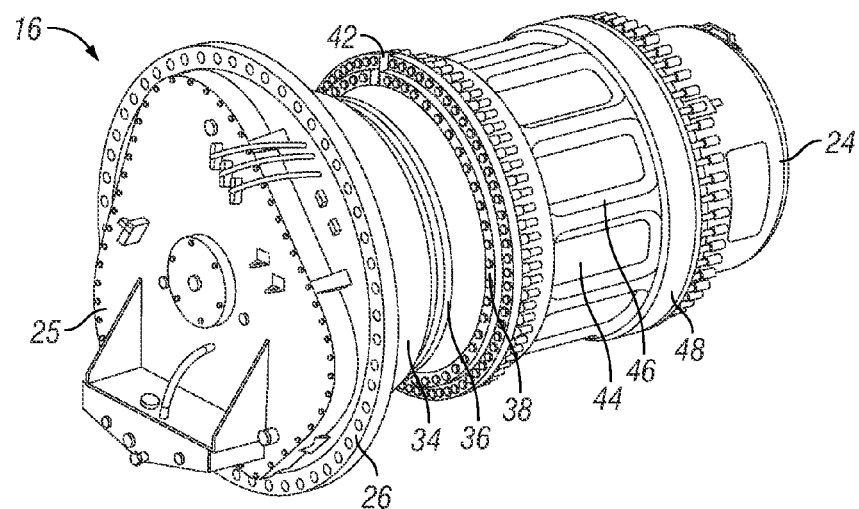

Referring to FIGS. 3 and 4, each inventive wheel assembly 16 includes the wheel frame 18, a torque tube 20, and the wheel hub 22 that is fastened to the torque tube and rotatably supported on the wheel frame. In some embodiments, the torque tube is bolted to the wheel hub 22, to which the tire assemblies 12 can be bolted as further discussed herein. The torque tube 20 and the wheel hub 22 are operatively connected to the wheel frame 18 by a planetary gearset, as further discussed below, such that the wheel hub 22 and the wheel frame 18 are mutually rotatable. In use, the wheel frame 18 is fixedly mounted to the OHV 10 such that the wheel hub 22 rotates with respect to the OHV 10. Axially adjacent to the wheel hub 22, a brake assembly 24 is fixedly mounted to the wheel frame 18, but is not fastened to the wheel hub. Axially opposite the brake assembly 24, a gear cover 25 is mounted onto the wheel frame 18.

Figure 5:
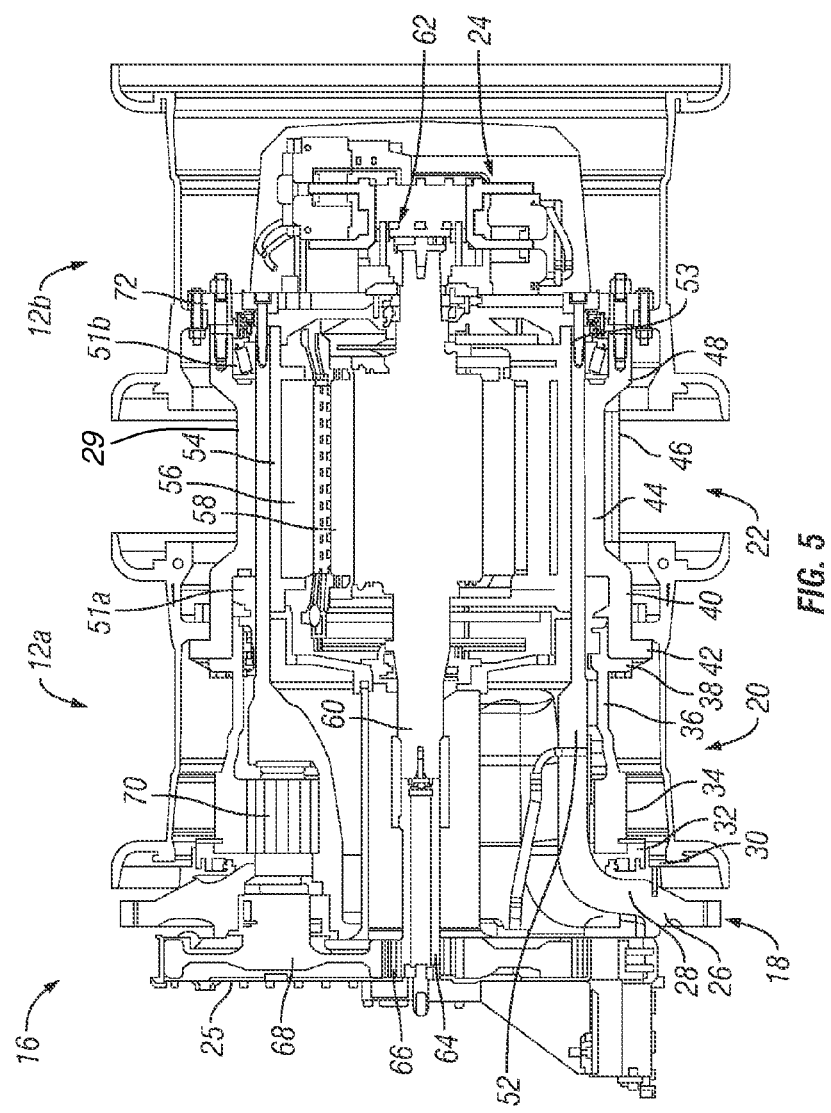
FIG. 5 is a side sectional view of the wheel drive assembly shown in FIGS. 3-4, depicting a wheel frame and wheel hub assembly according to an embodiment of the present invention.

Each wheel assembly 16 can be bolted to the vehicle 10 by way of a mounting flange 26 provided on the wheel frame 18. The wheel frame 18 is radially tapered from the mounting flange 26, through a generally conical or hyperbolic transition portion 28, to a main cylindrical or substantially cylindrical barrel portion 29 as shown in FIG. 5. By "generally" is meant that the transition portion 28 has a conical or hyperbolic shape, except for surface imperfections or deviations consequent to normal manufacturing practice, and including intentional features deviating from the general shape. For example, the transition portion 28 may include lands, grooves, notches, perforations, penetrations, and other functional features that diverge from an ideal conical or hyperbolic shape, as further discussed below. On the transition portion 28 of the wheel frame 18, an oil seal ring 30 is fixed to the wheel frame 18. The torque tube 20 is disposed around the radially outward facing surface of the barrel portion of the wheel frame 18. As depicted, the torque tube 20 includes a ring gear 34, which is engaged with pinion gears adjacent to the transition portion 28 of the wheel frame 18. The torque tube 20 also includes a tube portion 36 that extends from the ring gear 34 along the wheel frame to a hub flange 38 that is bolted to the wheel hub 22. Thus, the torque tube 20 is supported on the pinion gears (shown in FIG. 5) and on the wheel hub 22. On the end of the ring gear 34 adjacent to the oil seal ring 30, a complementary seal body 32 is fastened to and rotates with the torque tube 20.

An embodiment of the inventive wheel hub 22 includes a barrel 44 with ribs 46, which extends from an inboard end 40 to an outboard end 48. The inboard end 40 is bolted to the hub flange 38 of the torque tube 20. The wheel hub 22 also includes a rim flange 42, which protrudes radially outward around the inboard end 40 of the wheel hub.

FIG. 5 is a side sectional view illustrating multiple components of the wheel assembly 16 and their relationship to an embodiment of the inventive wheel hub 22 and wheel frame 18. As shown, at the inboard and outboard ends 40, 48 of the wheel hub 22, inboard and outboard bearings 51a, 51b, respectively, are provided to support the wheel hub on the barrel portion 52 of the wheel frame 18. The barrel portion 52 of the wheel frame 18 extends from the transition portion 28 to an annular hub end surface 53, to which the brake assembly 24 is mounted. Adjacent the hub end surface 53, an electric motor assembly 54 is housed inside the wheel frame 18. The electric motor 54 includes a stator 56 and a rotor 58, from which a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the wheel frame 18, a sun gear shaft 64 is splined to the first end of the shaft 60. The sun gear shaft 64 is formed to include a sun gear 66 housed centrally within the gear cover 25. The sun gear 66 is meshed with a plurality of planet gears 68 carried on common axles with pinion gears 70, which mesh with internal teeth of the torque tube ring gear 34. In select embodiments, there are three planet gears 68 and three pinion gears 70. The torque tube 20 is supported between the pinion gears and the wheel hub 22.

Referring to the wheel hub 22, an inboard or first wheel rim 12a is bolted to the rim flange 42. At the outboard end 48 of the wheel hub 22, a hub adapter 72 is bolted to the wheel hub 22 and an outboard or second wheel rim 12b is bolted to the hub adapter 72.

Figure 6:
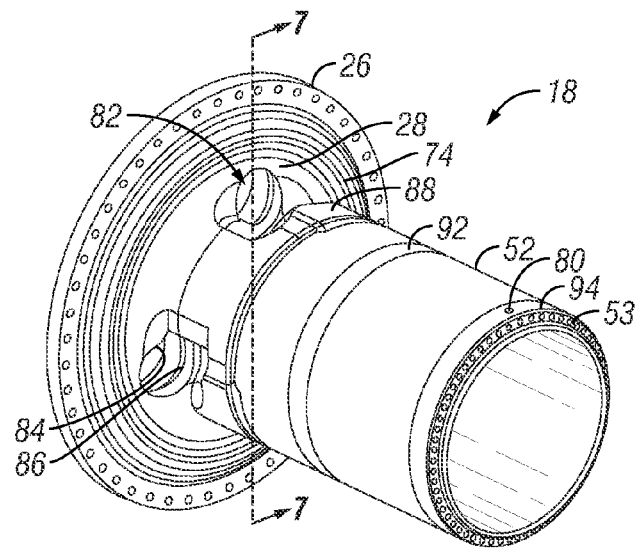
FIG. 6 is a perspective view of a hub end of the wheel frame shown in FIG. 5.
Figure 7:
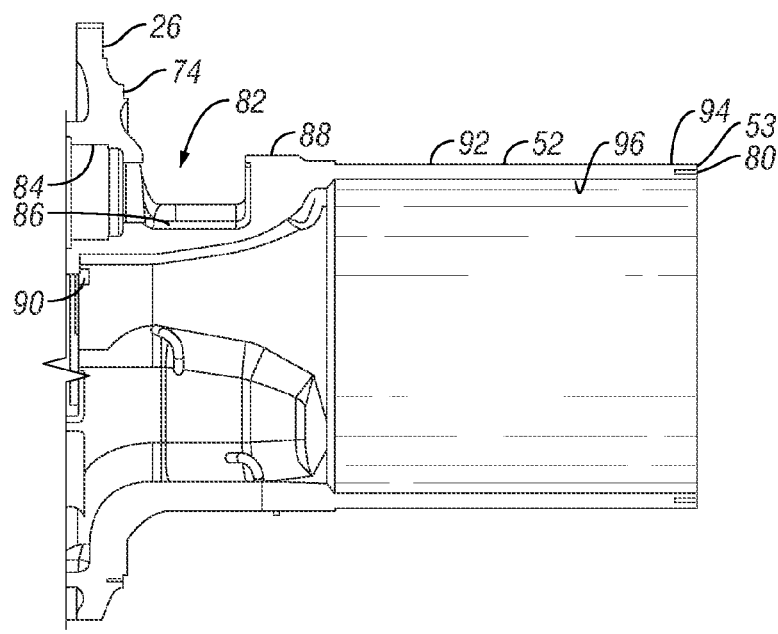
FIG. 7 is a side sectional view of the wheel frame shown in FIG. 6, sectioned along view plane 7-7.
Figure 8:
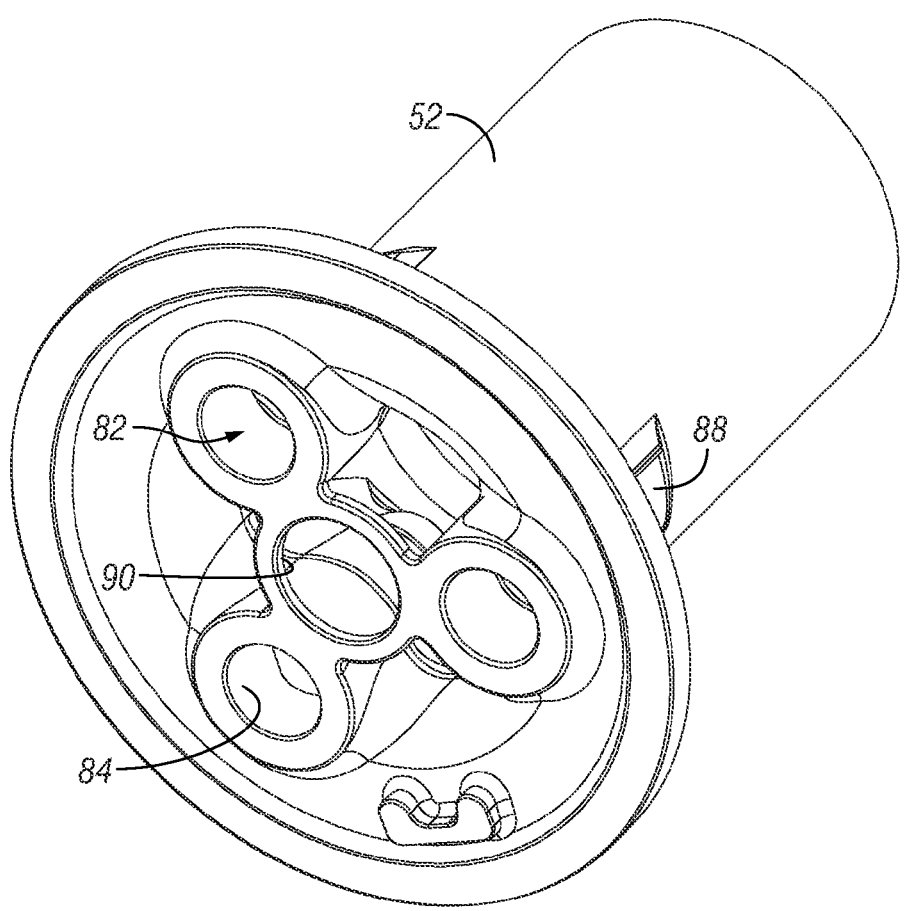
FIG. 8 is a perspective view of a mounting end of the wheel frame shown in FIGS. 6-7.

FIGS. 6-8 depicted in detail an embodiment of the inventive wheel frame 18. The wheel frame 18 is formed as a unitary or jointless structure, for example, by a casting process. The transition portion 28 of the wheel frame 18 is formed integrally with the mounting flange 26 and with the barrel portion 52, and includes an annular land 74 adapted to receive the mountable oil seal ring 32, for example, by bolted attachment. Optionally, a gasket may be installed between the oil seal ring 32 and the annular land 74. Between the transition portion 28 and the hub end surface 53, the barrel portion 52 is generally constant in circumference and thickness. However, adjacent to the hub end surface 53, a portion of the radially inward facing surface of the wheel frame 18 may be enlarged for receiving the electric traction motor 54. At the hub end surface 53, a plurality of threaded holes 80 are formed for receiving bolts to attach the brake assembly 24 as shown in FIG. 5.

The transition portion 28 of the wheel frame 18 also defines a plurality of pinion gear openings or apertures 82 that extend from a radially inward facing surface of the wheel frame 18 to the radially outward facing surface of the transition portion 28. In some embodiments, three pinion gear apertures 82 are provided at locations suitable for receiving the pinions 70 of the planetary gear set to be housed within the wheel frame 18, as shown in FIG. 5. Each pinion gear aperture 82 defines a planet axle bearing mount 84, and includes a radially outwardly concave cupped portion 86 that provides radial structural rigidity for the planet axle bearing mount 84 while also providing for engagement of the pinion gear 70 with internal teeth of a ring gear 34 mounted over the wheel frame 18, as shown in FIG. 5. Adjacent and in alignment with each pinion gear aperture, a planet axle mount 88 is formed as a significantly thickened portion of the monolithic wheel frame 18.

As particularly shown in FIG. 7, the planet axle mounts 88 can be circumferentially spaced rather than being formed as portions of a continuous thickened ring about the wheel frame 18. In select embodiments, the pinion gear apertures 82 and the planet axle mounts 88 are symmetrically circumferentially spaced and mutually axially aligned. However, in some embodiments of the invention, the pinion gear apertures can be formed at positions offset from symmetrically aligned locations. Circumferentially spacing the cupped portions 86 and the planet axle mounts 88 may aid in casting the wheel frame 18 by reducing time required for the cast metal to set. However, the circumferentially spaced cupped portions 86 may provide less torsional rigidity for the planet axle bearing mounts 84 than could be obtained from a continuous thick ring housing the pinion gear apertures 82. Accordingly, a supporting ring 90 (best seen in FIG. 8) is provided in structural association with each of the concave cupped portions 86 enclosing the plurality of the pinion gear apertures 82. The supporting ring 90 provides a convenient structure for supporting the gear cover 25 in alignment with the planetary gear set housed in the wheel frame 18.

Referring again to the barrel portion 52 of the wheel frame 18 as shown in FIG. 6, first and second external bearing surfaces 92 and 94 are formed near or proximate to the planet axle mounts 88 and near the hub end surface 53, respectively.

In some embodiments, the first external bearing surface 92 is formed within a first axial region of the barrel portion 52, proximate to the planet axle mounts 88, that extends axially along about one third of the barrel portion 52 from the planet axle mounts 88 toward the hub end 53. In some embodiments, the second external bearing surface 94 is formed within a second axial region of the barrel portion 52, proximate to the hub end surface 53, that extends axially along about one third of the barrel portion 52 from the hub end surface 53 toward the planet axle mounts 88. Turning to the side sectional view of FIG. 7, the barrel portion 52 of the wheel frame 18 includes a radially inward facing surface 96, of which a portion adjacent to the hub end surface 53 is dimensioned for installation of the electric motor 54 as shown in FIG. 5.

Figure 9:
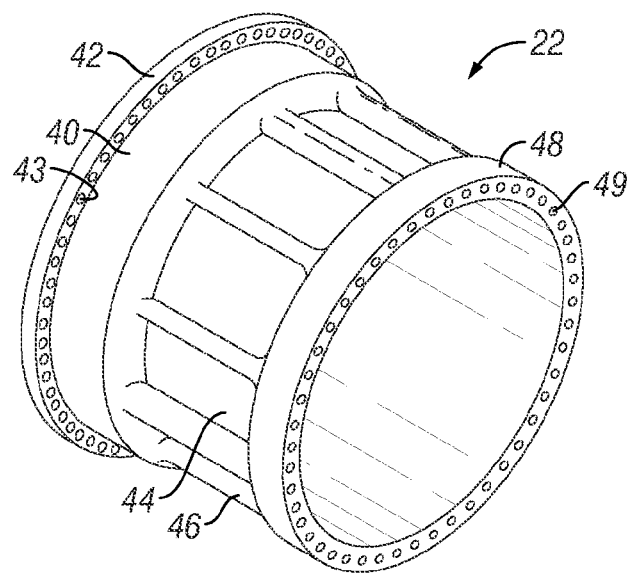
FIG. 9 is a perspective view of an outboard end wheel hub of the wheel drive assembly shown in FIG. 5.
Figure 10:
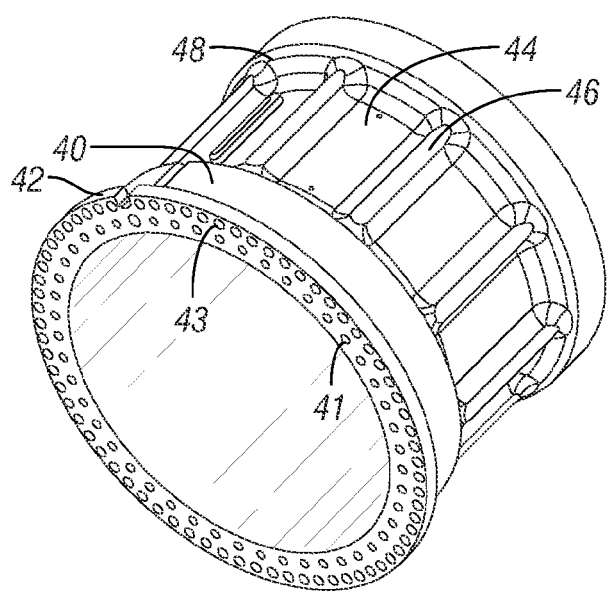
FIG. 10 is a perspective view of an inboard end of the wheel hub of FIG. 9.

Referring to FIGS. 9 and 10, an embodiment of the inventive wheel hub 22 is depicted. As shown, the barrel 44 and ribs 46 of the wheel hub 22 extend from the inboard end 40 to the outboard end 48. In embodiments of the invention, the wheel hub 22 is formed as a unitary or monolithic cast body. The barrel 44 is cylindrical or substantially cylindrical and has a radially inward facing surface disposed at an internal diameter chosen for a close clearance (non-interference, non-sliding) fit around the barrel portion 52 of the wheel frame 18. The radially inward facing surface of the inboard end 40 is flared outward from the internal diameter of the barrel 44, to provide an annular inboard bearing space 45a for receiving the inboard bearing 51a as discussed above with reference to FIG. 5. Similarly, the radially inward facing surface of the outboard end 48 also is flared outward to provide an annular outboard bearing space 45b for receiving the outboard bearing 51b as discussed above with reference to FIG. 5.

Threaded holes 41 are tapped axially into the inboard end 40 toward the outboard end 48 for bolted attachment of the torque tube 20 with the wheel hub 22. Bores 43 extend axially through the rim flange 42 for bolted attachment of the inboard wheel 12a. The bores 43 may be threaded for connection of threaded fasteners, or smooth to permit pass through of threaded or unthreaded fasteners. In certain embodiments of the invention, knurled ends of knurl studs are fitted into the bores 43, with the threaded ends protruding toward the outboard end 48. Threaded holes 49 are tapped axially into the outboard end 48 toward the inboard end 40 for bolted attachment of the hub adapter 72. The holes and bores 41, 43, 49, in some embodiments, are circumferentially spaced in a symmetric fashion and, in select embodiments, are not mutually aligned.

For weight reduction the thickness of the barrel portion is reduced so that the radially protruding ribs 46 transfer a substantial portion of torsional and bending loads between the inboard and outboard ends 40, 48. In select embodiments, the ribs 46 transfer about a majority of torsional loads and about a majority of bending loads. In certain embodiments, the ribs 46 transfer more than about 75% of torsional and bending loads. By "about" is meant that, within customary tolerances of manufacturing and measurement for off-highway vehicle components, the ribs 46 carry at or beyond the specified load fractions.

In use, an embodiment of the invention may include a wheel frame that has a unitary cylindrical body with a radially inward facing surface and a radially outward facing surface surrounding a wheel axis and extending from an integrally formed mounting flange to an open hub end. The radially inward facing surface of the body may include a portion adjacent the hub end of the body that is enlarged for receiving at least a portion of an electric motor assembly. The body of the inventive may include a plurality of pinion gear apertures opened from the radially inward surface to the radially outward surface adjacent to the mounting flange. The body may include a transition portion tapering radially from the mounting flange toward the hub end, with the plurality of pinion gear apertures extending through the transition portion at circumferentially symmetric locations. A plurality of planet axle mounts may be formed on a portion of the wheel frame adjacent to and in alignment with the plurality of pinion gear apertures. The transition portion also may include, radially outward from the pinion gear apertures, or between the pinion gear apertures and the mounting flange, an annular land configured to receive a mountable oil seal. The frame may include a supporting ring that is in structural association with a concave cupped portion of each of the pinion gear apertures. Between the transition portion and the hub end, the frame also may include a barrel portion extending around the wheel axis from of the wheel frame, the barrel portion including at least one bearing land. For example the barrel portion may include a first outer bearing land formed on a radially outward facing surface of the barrel portion adjacent to the transition portion and a second outer bearing land formed on the radially outward facing surface of the barrel portion proximate to the hub end. Alternatively or additionally, the barrel portion may include a first internal bearing land formed in a radially inward facing surface of the barrel portion adjacent to the transition portion.

In other embodiments, the inventive apparatus may also include a vehicular wheel assembly, which includes a unitary cylindrical wheel frame and a unitary cylindrical wheel hub. The inventive wheel frame has a radially inward facing surface and a radially outward facing surface surrounding a wheel axis and extending from an integrally formed mounting flange to an open hub end, the radially inward facing surface of the wheel frame including, adjacent the hub end, a portion adapted to house an electric motor assembly. The inventive wheel hub has a unitary cylindrical barrel, and is mounted around the hub end of the wheel frame and operatively connected to rotate with respect to the wheel frame. The unitary wheel hub includes at least one bore configured to receive bolts to secure the wheel hub to a wheel rim. The cylindrical interior of the unitary wheel hub may include at least one shoulder portion or bearing space configured to receive a bearing housing. The unitary wheel hub also includes a flange portion that may include a first plurality of bores configured to receive fasteners to secure the wheel hub to a torque tube and a second plurality of bores configured to secure the wheel hub to a first wheel rim. The unitary wheel hub also has an end portion at a distal end of the hub opposite the flange portion. The end portion of the wheel hub may include a third plurality of bores configured to secure the wheel hub to a second wheel rim. In some embodiments, the unitary wheel hub is a one-piece casting. The inventive wheel assembly also may include at least one wheel rim removably secured to the flange of the unitary wheel hub by bolts. Selected embodiments of the invention may also include an electric motor assembly installed into the hub end of the wheel frame.

In other embodiments, the inventive apparatus may include a monolithic or integrally formed vehicular wheel hub, which includes a unitary cylindrical cast body that has a first end with an integrally formed flange and a second end opposite the first end. The unitary cylindrical cast body includes a plurality of bores configured to receive fasteners to secure the wheel hub to a wheel rim. The unitary cylindrical cast body has an interior that may include at least one shoulder portion configured to define a bearing space to receive a bearing housing. The flange on the unitary wheel hub may include a first plurality of bores configured to receive fasteners to secure the wheel hub to a torque tube as well as a second plurality of bores configured to receive fasteners to secure the wheel hub to a first wheel rim. The second end of the unitary cylindrical cast body may include a third plurality of bores configured to receive fasteners to secure the wheel hub to a second wheel rim.

Another embodiment relates to a method for assembling a vehicle wheel by installing a torque tube to a hub end of a unitary cast wheel frame, and securing a flange portion of a unitary cast wheel hub to the torque tube. The inventive method also includes bolting a first wheel rim to the flange portion of the unitary cast wheel hub. Additionally, the method for assembly may include bolting a second wheel rim to an end portion of the unitary cast wheel hub, the end portion being opposite the flange portion. Selected embodiments of the method include placing at least one bearing within the unitary cast wheel hub prior to securing a flange portion of the wheel hub to the torque tube. The inventive method may also include installing a traction motor and shaft within the wheel frame, and placing at least one gear within the wheel frame in mating engagement with the shaft.

Certain embodiments herein have referred to cast wheel components. Casting is a manufacturing process by which a liquid material is usually poured into a mold, which contains a hollow cavity of the desired shape, and then allowed to solidify. The solidified part is also known as a casting, which is ejected or broken out of the mold to complete the process.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those ordinarily skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described unitary wheel frame, unitary wheel hub, assembly, and method for assembly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A wheel frame for a vehicle, comprising:
a body of unitary construction and having a flared cylindrical shape, with a radially inward facing surface and a radially outward facing surface that extend from an integrally formed mounting flange through a radially tapering transition portion and a substantially constant-radius barrel portion to a hub end that opposes and is of smaller radius than the mounting flange; and
the radially inward facing surface of the body including a portion adjacent the hub end of the body that is enlarged for receiving at least a portion of an electric motor assembly.

2. A wheel frame as claimed in claim 1, wherein the body defines a plurality of apertures opened through the radially tapering transition portion adjacent to the mounting flange.

3. A wheel frame as claimed in claim 2, wherein the plurality of apertures extend through the transition portion of the wheel frame at circumferentially symmetric locations and a plurality of axle mounts are disposed on a the radially outward surface of the body adjacent to and in alignment with the plurality of apertures.

4. A wheel frame as claimed in claim 3, wherein the transition portion includes between the mounting flange and the plurality of apertures an annular land configured to receive a mountable oil seal.

5. A wheel assembly for a vehicle, comprising:
a wheel frame as claimed in claim 1;
a unitary cylindrical wheel hub disposed around the hub end of the wheel frame and operatively connected to rotate with respect to the wheel frame, the unitary cylindrical wheel hub including at least one bore configured to receive bolts to secure the wheel hub to at least a first wheel rim; and
an electric motor assembly installed into the hub end of the wheel frame.

6. The wheel assembly of claim 5, wherein the unitary cylindrical wheel hub has a cylindrical interior that includes at least one shoulder portion configured to receive a bearing housing.

7. The wheel assembly of claim 5, wherein the unitary cylindrical wheel hub has a flange portion, and the at least one bore comprises a first plurality of bores disposed at an inward radius of the flange portion and configured to secure the wheel hub to a torque tube, and a second plurality of bores disposed at an outward radius of the flange portion and configured to secure the wheel hub to the first wheel rim.

8. The wheel assembly of claim 7, wherein the unitary cylindrical wheel hub has a end portion at a distal end of the hub opposite the flange portion, the end portion including a third plurality of bores configured to secure the wheel hub to a second wheel rim.

9. The wheel assembly of claim 5, wherein the unitary cylindrical wheel hub is a one-piece casting.

10. The wheel assembly of claim 5, further comprising the first wheel rim removably secured to the unitary cylindrical wheel hub with the bolts received in the at least one bore.

11. The wheel frame of claim 1, wherein the body is a one-piece casting.

12. A wheel frame comprising:
a body of unitary construction and having a flared cylindrical shape, with a radially inward facing surface and a radially outward facing surface that extend from an integrally formed mounting flange through a radially tapering transition portion and a substantially constant-radius barrel portion to a hub end that opposes and is of smaller radius than the mounting flange; and
the radially inward facing surface of the body including a portion adjacent the hub end of the body that is enlarged for receiving at least a portion of an electric motor assembly,
wherein the body defines a plurality of apertures opened through the radially tapering transition portion-adjacent to the mounting flange, the plurality of apertures extend through the transition portion of the wheel frame at circumferentially symmetric locations and a plurality of axle mounts are disposed on the radially outward surface of the body adjacent to and in alignment with the plurality of apertures, and the wheel frame includes a supporting ring that is integrally connected with a concave cupped portion of each of the apertures.

13. A wheel frame as claimed in claim 12, further comprising: a barrel portion extending around the wheel axis from the transition portion to the hub end of the wheel frame, the barrel portion including at least one bearing land.

14. A wheel frame as claimed in claim 13, wherein the at least one bearing land includes a first outer bearing land on a radially outward facing surface of the barrel portion adjacent to the transition portion and a second outer bearing land on the radially outward facing surface of the barrel portion proximate to the hub end.

15. A wheel frame as claimed in claim 13, wherein the at least one bearing land includes a first internal bearing land in a radially inward facing surface of the barrel portion adjacent to the transition portion.

16. A wheel hub for a vehicle, comprising:
a unitary cylindrical cast body having a first end with an integrally formed radially outward flange and having a second end opposite the first end, the unitary cylindrical cast body having at least a first plurality of bores configured axially through the radially outward flange to receive fasteners to secure the wheel hub to at least a first wheel rim, a second plurality of bores configured in the first end to receive fasteners to secure the wheel hub to a torque tube, and a third plurality of bores configured in the second end to receive fasteners to secure the wheel hub to a second wheel rim.

17. The wheel hub of claim 16, wherein the unitary cylindrical cast body has an interior that includes at least one shoulder portion configured to receive a bearing housing.

* * * * *